(12) United States Patent
Oka et al.

(10) Patent No.: US 9,764,480 B2
(45) Date of Patent: Sep. 19, 2017

(54) ROBOT

(71) Applicant: KABUSHIKI KAISHA YASKAWA DENKI, Kitakyushu-shi (JP)

(72) Inventors: Takenori Oka, Fukuoka (JP); Manabu Okahisa, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 339 days.

(21) Appl. No.: 14/503,405

(22) Filed: Oct. 1, 2014

(65) Prior Publication Data

US 2015/0013492 A1 Jan. 15, 2015

Related U.S. Application Data

(63) Continuation of application No. 12/912,750, filed on Oct. 27, 2010, now abandoned.

(30) Foreign Application Priority Data

Nov. 10, 2009 (JP) ................................. 2009-257212

(51) Int. Cl.
*B25J 17/00* (2006.01)
*B25J 9/00* (2006.01)
(Continued)

(52) U.S. Cl.
CPC .............. *B25J 17/00* (2013.01); *B25J 9/0084* (2013.01); *B25J 9/0087* (2013.01); *B25J 9/046* (2013.01);
(Continued)

(58) Field of Classification Search
CPC .............. B25J 17/00; B25J 17/02; B25J 18/00
(Continued)

(56) References Cited

U.S. PATENT DOCUMENTS 4,991,456 A * 2/1991 Shibata .................... B25J 9/047
74/490.03
5,016,489 A * 5/1991 Yoda ........................ B25J 9/046
74/490.03
(Continued)

FOREIGN PATENT DOCUMENTS

CN 1660546 8/2005
JP 60135188 7/1985
(Continued)

OTHER PUBLICATIONS

Japanese Office Action for corresponding JP Application No. 2009-257212, Apr. 30, 2013.
(Continued)

*Primary Examiner* — Zakaria Elahmadi
(74) *Attorney, Agent, or Firm* — Mori & Ward, LLP

(57) ABSTRACT

A robot includes a body, a first arm, and a second arm. The first arm includes one joint, an adjacent joint that is adjacent to the one joint, and another adjacent joint that is adjacent to the adjacent joint. When the first arm is extended in a vertical orientation relative to the body, the one joint of the first arm has a rotation axis that is offset by a first distance in a first horizontal direction from a rotation axis of the adjacent joint of the first arm, and the another adjacent joint of the first arm has a rotation axis that is offset by a second distance in a second horizontal direction from the rotation axis of the adjacent joint of the first arm. The first horizontal direction is opposite to the second horizontal direction.

21 Claims, 5 Drawing Sheets

(51) Int. Cl.
*B25J 9/04* (2006.01)
*B25J 9/06* (2006.01)

(52) U.S. Cl.
CPC ........... *B25J 9/06* (2013.01); *Y10T 74/20317* (2015.01); *Y10T 74/20323* (2015.01); *Y10T 74/20329* (2015.01)

(58) Field of Classification Search
USPC .... 74/490.03, 490.05, 490.06; 901/8, 15, 28
See application file for complete search history.

(56) References Cited

U.S. PATENT DOCUMENTS

| | | | |
|---|---|---|---|
| 5,105,367 A | | 4/1992 | Tsuchihashi et al. |
| 5,155,423 A * | | 10/1992 | Karlen ................ B25J 9/04 318/568.1 |
| 5,305,653 A * | | 4/1994 | Ohtani ................ B25J 17/0283 74/490.03 |
| 5,357,824 A * | | 10/1994 | Hashimoto ............ B25J 9/047 414/917 |
| 5,577,414 A * | | 11/1996 | Ogawa ................ B25J 9/04 414/744.5 |
| 5,901,613 A * | | 5/1999 | Forslund ................ B25J 9/046 414/917 |
| 5,949,209 A * | | 9/1999 | Okamoto ............ B25J 19/0079 174/17 GF |
| 6,267,022 B1 * | | 7/2001 | Suzuki ................ B25J 19/0075 74/490.01 |
| 6,408,710 B1 * | | 6/2002 | Kullborg ................ B62D 3/123 180/428 |
| 7,039,498 B2 * | | 5/2006 | Bacchi ................ B25J 9/1692 414/744.3 |
| 7,202,442 B2 * | | 4/2007 | Nakagiri ............ B25J 19/0029 219/125.1 |
| 7,971,504 B2 * | | 7/2011 | Haniya ................ B25J 9/0087 74/490.03 |
| 8,266,979 B2 * | | 9/2012 | Yonehara ................ B25J 9/046 74/490.02 |
| 8,308,419 B2 * | | 11/2012 | Nihei ................ B25J 9/0009 414/680 |
| 8,651,796 B2 * | | 2/2014 | Hosek ................ B25J 9/042 414/744.1 |
| 2005/0016313 A1 * | | 1/2005 | Robertson ................ B25J 9/046 74/490.01 |
| 2005/0189333 A1 | | 9/2005 | Nakagiri et al. |
| 2006/0156852 A1 * | | 7/2006 | Haniya ................ B25J 9/102 74/490.03 |
| 2006/0179964 A1 * | | 8/2006 | Hama ................ B25J 9/06 74/490.05 |
| 2009/0114053 A1 * | | 5/2009 | Mikaelsson ............ B25J 9/0009 74/490.05 |
| 2009/0178506 A1 * | | 7/2009 | Yamamoto ................ B25J 9/102 74/490.03 |
| 2010/0191374 A1 * | | 7/2010 | Tsai ................ G05B 19/404 700/258 |
| 2011/0067521 A1 * | | 3/2011 | Linn ................ B25J 15/0009 74/490.06 |
| 2011/0140330 A1 * | | 6/2011 | Nishikawa ................ B23K 9/02 269/55 |
| 2012/0011956 A1 * | | 1/2012 | Lundberg ................ B25J 9/04 74/490.03 |
| 2015/0104283 A1 * | | 4/2015 | Nogami ................ B25J 9/0087 414/730 |

FOREIGN PATENT DOCUMENTS

| | | |
|---|---|---|
| JP | 02-198778 | 8/1990 |
| JP | 02-237782 | 9/1990 |
| JP | 2008-272883 | 11/2008 |
| WO | WO 2010/118769 | 10/2010 |

OTHER PUBLICATIONS

Extended European Search Report for corresponding EP Application No. 10188977.2-2316, Mar. 10, 2011.
Chinese Office Action for corresponding CN Application No. 201010539676.X, Nov. 4, 2013.

* cited by examiner

ROBOT

CROSS-REFERENCE TO RELATED APPLICATION

The present application is a continuation application of the U.S. patent application Ser. No. 12/912,750 filed Oct. 27, 2010, which claims priority under 35 U.S.C. §119 to Japanese Patent Application No. 2009-257212, filed Nov. 10, 2009. The contents of these applications are incorporated herein by reference in their entirety.

BACKGROUND OF THE INVENTION

1. Field of the Invention

The present invention relates to a robot.

2. Description of the Related Art

In most typical vertical articulated robots, an arm mounted on a base includes six or seven rotary joints, and portions provided on distal-end sides (robot-hand sides) of the joints are rotated or turned.

The moving range of the hand of such a robot can be widened by increasing the length of the arm. Meanwhile, if the arm is folded so that the hand of the robot is placed in an area near the base, it is necessary to prevent the hand from interfering with the arm. For this reason, the moving range of the hand of the robot is set such as not to include the area near the base.

In recent years, there has been a demand for a robot that can perform more complicated operation and moving range. Hence, the robot is required to operate in a manner such that the hand can be placed both at positions sufficiently distant from the base and positions closer to the base.

As a technique for solving this problem, Japanese Patent Laid-Open Publication No. 2008-272883 discloses a structure for offsetting the rotation axis of an arm in a middle portion of the arm. According to this disclosed technique, even in a state in which the arm is folded, a wide moving range can be ensured while avoiding interference between the arm portions.

SUMMARY OF THE INVENTION

According to one aspect of the present invention, a robot includes a body, a first arm, and a second arm. The first arm includes a plurality of members connected by a plurality of joints. The second arm includes a plurality of members connected by a plurality of joints. The first arm includes one joint, an adjacent joint that is adjacent to the one joint, and another adjacent joint that is adjacent to the adjacent joint. When the first arm is extended in a vertical orientation relative to the body, the one joint of the first arm has a rotation axis that is offset by a first distance in a first horizontal direction from a rotation axis of the adjacent joint of the first arm, and the another adjacent joint of the first arm has a rotation axis that is offset by a second distance in a second horizontal direction from the rotation axis of the adjacent joint of the first arm. The first horizontal direction is opposite to the second horizontal direction. The second arm includes one joint, an adjacent joint that is adjacent to the one joint of the second arm, and another adjacent joint that is adjacent to the adjacent joint of the second arm. When the second arm is extended in a vertical orientation relative to the body, the one joint of the second arm has a rotation axis that is offset by a third distance in a third horizontal direction from a rotation axis of the adjacent joint of the second arm, and the another adjacent joint of the second arm has a rotation axis that is offset by a fourth distance in a fourth horizontal direction from the rotation axis of the adjacent joint of the second arm. The third horizontal direction is opposite to the fourth horizontal direction.

BRIEF DESCRIPTION OF THE DRAWINGS

The embodiments of the present invention will be described in further detail with reference to the accompanying drawings wherein.

DETAILED DESCRIPTION OF THE EMBODIMENTS

First Embodiment

Overall Configuration

A first embodiment will be described below with reference to the drawings.

Figure 1:
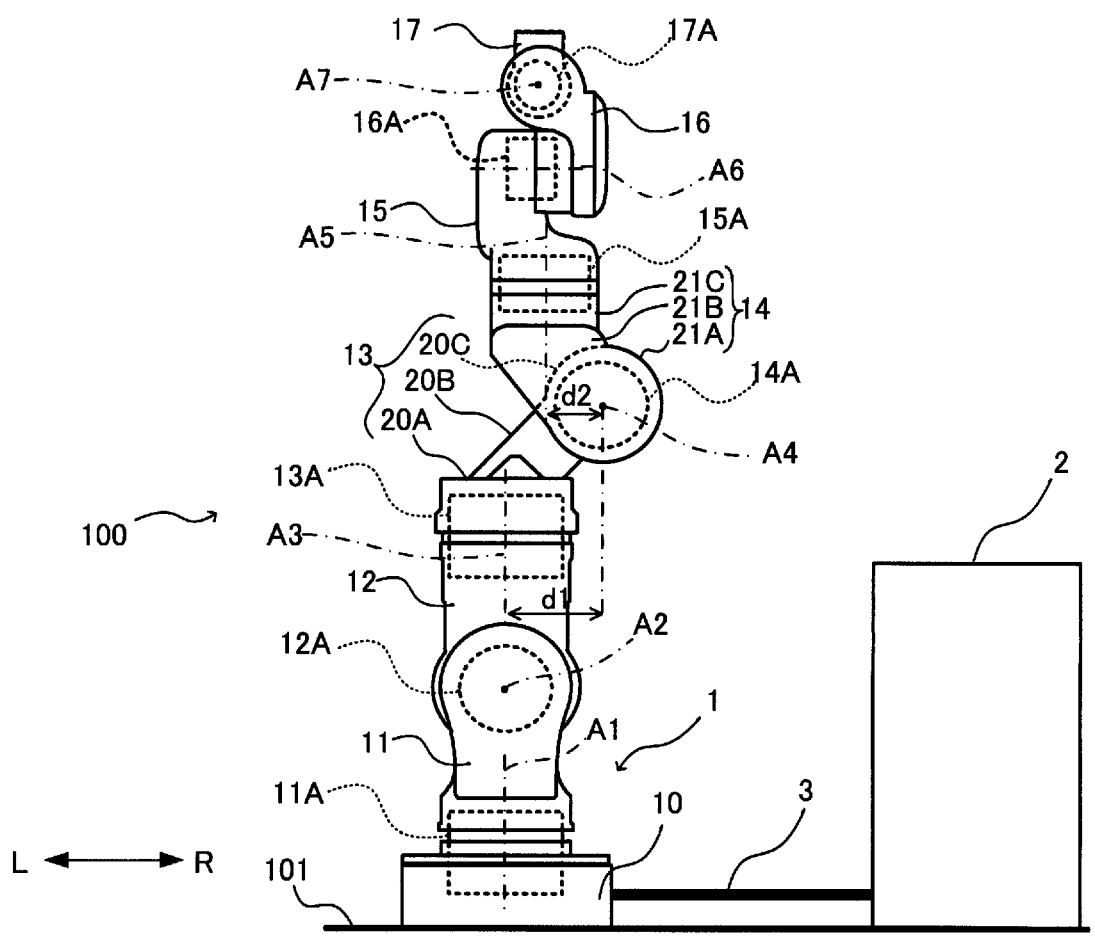
FIG. 1 is a side view illustrating a configuration of a robot according to a first embodiment.

As illustrated in FIG. 1, a robot system 100 according to the first embodiment includes a seven-axis vertical articulated robot 1, a robot controller 2, and a cable 3 that connects the robot 1 and the robot controller 2.

The robot controller 2 is formed by a computer including a memory, an electronic processor, and an input (all of them not illustrated), and is connected to below-described actuators in the robot 1 by the cable 3. The cable 3 is formed by bundling and sheathing signal communication lines between the robot controller 2 and the actuators and power feeding lines for supplying power from a power supply (not shown) to the actuators.

The robot 1 includes a base 10 fixed to a mounting surface (e.g., floor or ceiling) 101, and an arm. In the arm, an arm member (first member) 11, an arm member (second member) 12, an arm member (third member) 13, an arm member (fourth member) 14, an arm member (fifth member) 15, an arm member (sixth member) 16, and a flange (seventh member 17) are connected by rotary joints (first to seventh joints) in order from the base 10 to a leading end of the robot 1. That is, the arm is constituted by the arm members 11 to 17 and the rotary joints.

More specifically, the base 10 and the arm member 11 are connected by a first actuator (first joint) 11A, and the arm member 11 is rotated by driving of the first actuator 11A. The arm member 11 and the arm member 12 are connected by a second actuator (second joint) 12A, and the arm member 12 is pivoted by driving of the second actuator 12A.

The arm member 12 and the arm member 13 are connected by a third actuator (third joint) 13A, and the arm member 13 is rotated by driving of the third actuator 13A. The arm member 13 and the arm member 14 are connected by a fourth actuator (fourth joint) 14A, and the arm member 14 is pivoted by driving of the fourth actuator 14A.

The arm member 14 and the arm member 15 are connected by a fifth actuator (fifth joint) 15A, and the arm member 15 is rotated by driving of the fifth actuator 15A.

The arm member 15 and the arm member 16 are connected by a sixth actuator (sixth joint) 16A, and the arm member 16 is pivoted by driving of the sixth actuator 16A.

The arm member 16 and the flange 17 are connected by a seventh actuator (seventh joint) 17A, and the flange 17 and an end effecter (not shown), such as a hand, which is attached to the flange 17 are pivoted by driving of the seventh actuator 17A.

As illustrated in FIG. 1, the arm member 13 includes a receiving portion (receiving portion A) 20A that receives the third actuator 13A, a connecting portion (connecting portion A) 20B obliquely extending from the receiving portion 20A to the upper right side of the figure (in the R-direction and a direction towards the leading end), and a receiving portion (receiving portion B) 20C that receives the fourth actuator 14A. The receiving portion 20A, the receiving portion 20C, and the connecting portion 20B form a continuous internal space, where the cable 3 is stored.

The arm member 14 includes a receiving portion (receiving portion A) 21A that receives the fourth actuator 14A, a connecting portion (connecting portion B) 21B obliquely extending from the receiving portion 21A to the upper left side of the figure (in the L-direction and a direction towards the leading end), and a receiving portion (receiving portion D) 21C that receives the fifth actuator 15A. The receiving portion 21A, the receiving portion 21C, and the connecting portion 21B form a continuous internal space.

That is, the receiving portion 20A, the receiving portion 20C, the connecting portion 20B, the receiving portion 21A, the receiving portion 21C, and the connecting portion 21B correspond to the offset portion.

Each of the first to seventh actuators 11A to 17A is formed by a servo motor with built-in reduction gears. The servo motor has a hole through which the cable 3 can extend. The first to seventh actuators 11A to 17A are connected to the robot controller 2 by the cable 3.

When the robot 1 takes an attitude such that rotation axes A1, A3, and A5 (referred to as rotation axes in the rotating direction) are perpendicular to the mounting surface 101 (a state illustrated in FIG. 1), rotation axes A2, A4, A6, and A7 (rotation axes in the pivot direction) are at an angle of 90 degrees to the rotation axes in the rotating direction. Further, the rotation axis A6 is at an angle of 90 degrees to the rotation axis A7.

The rotation axis A1 of the first actuator 11A and the rotation axis A3 of the third actuator 13A are substantially aligned with each other. Also, the rotation axis A1 and the rotation axis A3 are orthogonal to the rotation axis A2 of the second actuator 12A.

The rotation axes A1 and A3 do not intersect the rotation axis A4 of the fourth actuator 14A, and are offset from the rotation axis A4 by a length d1 in a direction horizontal to the mounting surface 101 (in a R-direction with reference to the rotation axis A3).

In other words, the offset refers to a state in which a rotation axis different from a rotation axis at a base end is shifted from the rotation axis at the base end in the orthogonal direction when the robot or the arm takes an attitude such that the projection area thereof on the mounting surface is the smallest.

Further, the rotation axis A4 does not intersect the rotation axis A5 of the fifth actuator 15A, and is offset from the rotation axis A5 by a length d2 in the direction horizontal to the mounting surface 101 (in the rightward direction of the figure with reference to the rotation axis A4).

Therefore, the rotation axis A3 and the rotation axis A5 are offset by a length |d1−d2| in the direction horizontal to the mounting surface 101 (in the rightward direction of the figure with reference to the rotation axis A3).

In the first embodiment, the length d1 is set to be larger than the length d2 (that is, d1>d2). The width of the arm member 13 is larger than the width of the arm member 15.

Figure 2:
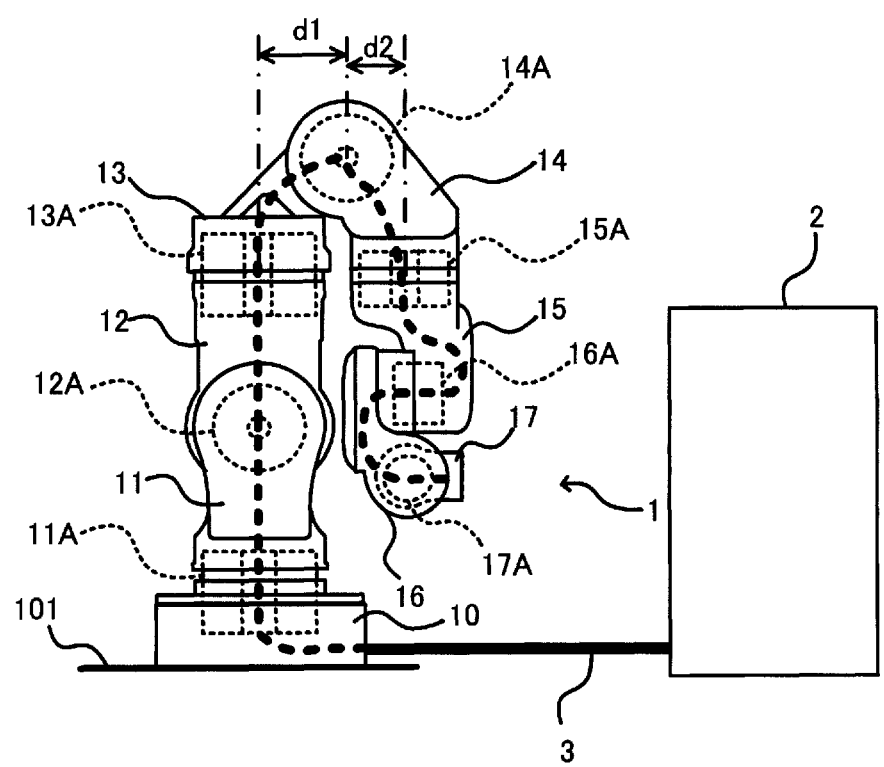
FIG. 2 is a side view illustrating the configuration of the robot of the first embodiment.

The base 10 has a cable insertion hole (not shown). As illustrated in FIG. 2, the cable 3 passes, in order, through the interior of the base 10, the hole of the first actuator 11A, the arm member 11, the hole of the second actuator 12A, the arm member 12, the hole of the third actuator 13A, the receiving portion 20A, the connecting portion 20B, the receiving portion 20C, the hole of the fourth actuator 14A, the receiving portion 21A, the connecting portion 21B, the receiving portion 21C, the hole of the fifth actuator 15A, the arm member 15, the hole of the sixth actuator 16A, the arm member 16, and the hole of the seventh actuator 17A. Further, the cable 3 is connected to the end effecter (not shown) via a hole of the flange 17.

Since the robot system 100 of the first embodiment has the above-described configuration, when the robot system 100 operates with the flange 17 being placed near the base 10 or the arm member 11, in a state in which the fourth actuator 14A is greatly rotated, as illustrated in FIG. 2, the rotation axis A3 and the rotation axis A5 are offset from each other by the sum of the length d1 and the length d2 (that is, d1+d2), which increases the offset amount between the rotation axis A3 and the rotation axis A5. For this reason, even when the fourth actuator 14A is bent to obtain an attitude such that the rotation axis A3 and the rotation axis A5 become substantially parallel to each other, it is possible to prevent the arm member 13 and the arm member 15 from touching and interfering each other and to allow the flange 17 to reach a lower position near the arm member 11.

In contrast, during a standby state of the robot system 100, the robot 1 is operated so that the rotation axis A1, the rotation axis A3, and the rotation axis A5 become perpendicular to the mounting surface 101. This can minimize the amount of protrusion of the robot 1 in the direction horizontal to the mounting surface 101. In this case, the offset amount of the rotation axes A1 and A3 from the rotation axis A4 is limited to the length d1.

In other words, the offset amount corresponding to d1+d2 can be obtained in the state where the fourth actuator 14A is bent, and the offset amount can be limited to d1 (d1<d1+d2) in the standby state. Thus, a wide moving range of the flange 17 can be ensured by the offset, and moreover space saving can be achieved.

The cable 3 passes through the hole of the third actuator 13A, is gently bent in the connecting portion 20B, passes through the hole of the fourth actuator 14A, is gently bent in the connecting portion 21B, and is then guided to the hole of the fifth actuator 15A. Therefore, even if the angle between the arm member 13 and the arm member 14 is made more acute by greatly rotating the fourth actuator 14A, the curvature of the cable 3 can be limited to a relatively small value. Hence, it is possible to reduce damage to the cable 3 due to the increase in curvature of the cable 3.

In the first embodiment, the fifth actuator 15A rotates the arm member 15, the sixth actuator 16A pivots the arm member 16, and the seventh actuator 17A rocks the flange 17 at an angle of 90 degrees to the pivot direction of the arm member 16. Hence, unlike the case in which the seventh actuator 17A rotates the flange 17, it is possible to prevent an out-of-control point (singular point) from being caused by overlapping of the rotation axis A5 and the rotation axis A7. For this reason, it is unnecessary to perform an operation for avoiding the singular point in the attitude such that the fourth actuator 14A is bent (state of FIG. 2). This increases the degree of flexibility in operation of the robot 1.

Second Embodiment

Figure 3:
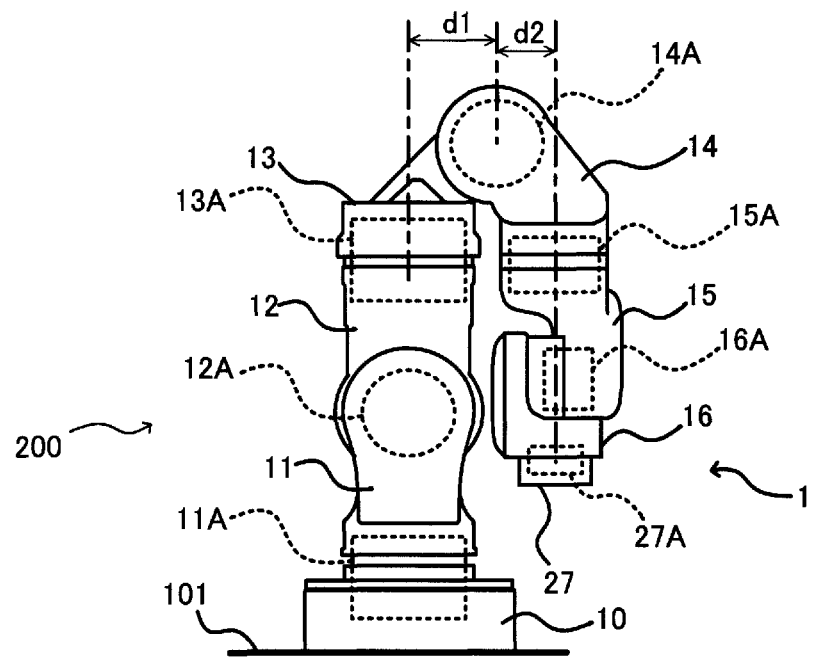
FIG. 3 is a side view illustrating a configuration of a robot according to a second embodiment.

Next, a second embodiment will be described. As illustrated in FIG. 3, a robot system 200 of the second embodiment is different from the robot 1 of the first embodiment only in an attachment direction of a seventh actuator 27A (seventh joint) and a flange 27. Therefore, in the following description, for convenience of explanation, redundant descriptions are appropriately omitted, and like components are denoted by like reference numerals.

In the second embodiment, an arm member 16 is connected to the flange 27 by the seventh actuator 27A, and the flange 27 and an end effecter (not shown), such as a hand, attached to the flange 27 are rotated by driving of the seventh actuator 27A.

Since the robot system 200 of the second embodiment has the above-described configuration, in contrast to the robot 1 of the first embodiment, it is necessary to avoid a singular point caused when a fourth actuator 14A is bent, but it is possible to easily rotate the end effecter attached to the flange 27 by simply driving the seventh actuator 27A. Thus, the second embodiment is suitable for an application in which the end effecter is rotated.

Third Embodiment

Figure 4:
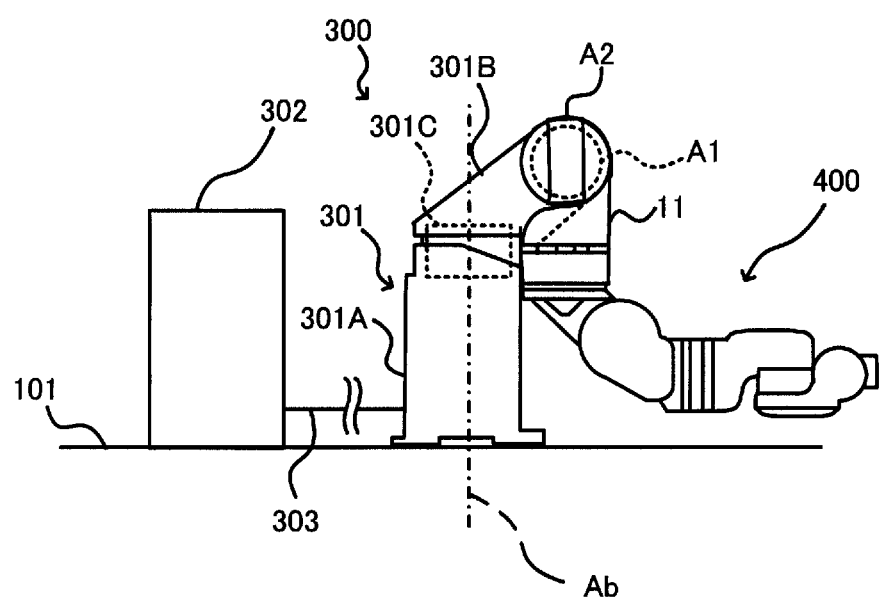
FIG. 4 is a side view illustrating a configuration of a robot according to a third embodiment.
Figure 5:
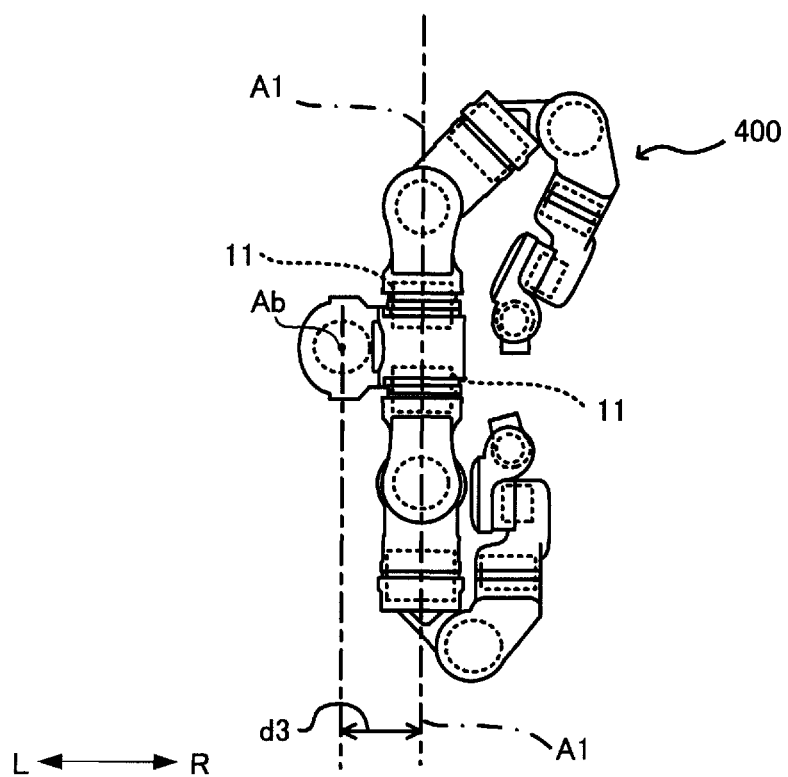
FIG. 5 is a top view illustrating the configuration and a moving range of the robot of the third embodiment.

Next, a third embodiment will be described. As illustrated in FIGS. 4 and 5, the third embodiment is different from the first embodiment in that the base adopted in the first embodiment is removed and the body is provided with a pair of (two) arms 400 having a structure similar to that of the arm of the robot 1. Therefore, descriptions overlapping with the first embodiment are appropriately omitted, and like components are denoted by like reference numerals.

In a robot system 300 of the third embodiment, two arms 400 are attached to a body 301 (corresponding to the base) fixed to a mounting surface 101.

The body 301 includes a base portion 301A fixed to the mounting surface 101, and a turning body portion (main body) 301B that turns relative to the base portion 301A via an actuator 301C.

The turning body portion 301B obliquely extends upward (to the upper right of FIG. 4) from the actuator 301C, and has an opening where the pair of arms 400 can be attached.

A rotation axis Ab of the actuator 301C is offset from rotation axes A1 of first actuators 11A in the arms 400 by a length d3 in a direction horizontal to the mounting surface 101 (R-direction with reference to the rotation axis Ab).

In the third embodiment, the arms 400 are attached to the turning body portion 301B in a manner such that the rotation axes A1 of the respective first actuators 11A are arranged on the same straight line (the orientations of the arms 400 can be changed appropriately). That is, the turning body portion 301B also functions as a bases for both of the arms 400. A robot controller 302 is connected to the arms 400 by a cable 303 so that the actuators of the arms 400 operate according to commands from the robot controller 302.

Since the robot system 300 of the third embodiment has the above-described configuration, it is possible to enlarge the moving range where the pair of arms 400 cooperate near the body, for example, during assembly of mechanical products. This achieves further space saving.

Further, the turning body portion 301B obliquely extends upward and the pair of arms 400 are attached thereto. Thus, the offset between the rotation axis Ab and the rotation axis A1 allows the flanges 17 of the arms 400 to be moved to farther positions by rotating the actuator 301C.

In addition, ends of the arms 400 can reach even a space formed near the base portion 301A and below the turning body portion 301B. Therefore, operation can be performed utilizing the space below the turning body portion 301B, and this achieves further space saving.

While the embodiments of the present invention have been described above, the robot system of the present invention is not limited to the above embodiments, and appropriate modifications can be made without departing from the scope of the present invention.

For example, while the robot of the first embodiment is attached to the body in the third embodiment, the arm attached to the body may be similar to the arm adopted in the robot system 200 of the second embodiment.

While the robot has seven joints in the above embodiments, it may have three joints. For example, the structures other than the third to fifth actuators 13A, 14A, and 15A and the arm members 13 to 15 in the first embodiment may be removed from the robot.

What is claimed is:
1. A robot comprising:
a body;
a first arm including a plurality of members connected by a plurality of joints; and
a second arm including a plurality of members connected by a plurality of joints,
wherein the first arm includes one joint, an adjacent joint that is adjacent to the one joint, and another adjacent joint that is adjacent to the adjacent joint,
wherein the first arm has a first vertical orientation in which the first arm is extended in a vertical direction to a first position at which a longitudinal end of the first arm is at a highest position in the first arm,
wherein, when the first arm is extended in the first vertical orientation relative to the body, the adjacent joint of the first arm has a rotation axis that is offset by a first distance in a first horizontal direction from a rotation axis of the one joint of the first arm, and the another adjacent joint of the first arm has a rotation axis that is offset by a second distance in a second horizontal direction from the rotation axis of the adjacent joint of the first arm, the first horizontal direction being opposite to the second horizontal direction,
wherein the second arm includes one joint, an adjacent joint that is adjacent to the one joint of the second arm, and another adjacent joint that is adjacent to the adjacent joint of the second arm,
wherein the second arm has a second vertical orientation in which the second arm is extended in the vertical direction to a second position at which a longitudinal end of the second arm is at a highest position in the second arm, and
wherein, when the second arm is extended in the second vertical orientation relative to the body, the adjacent joint of the second arm has a rotation axis that is offset by a third distance in a third horizontal direction from a rotation axis of the one joint of the second arm, and the another adjacent joint of the second arm has a rotation axis that is offset by a fourth distance in a fourth horizontal direction from the rotation axis of the adjacent joint of the second arm, the third horizontal direction being opposite to the fourth horizontal direction.

2. The robot according to claim 1,
wherein the body includes
- a base member configured to be fixed to a mounting surface, and
- a body portion connected to the base member via a turning joint configured to turn the body portion relative to the base member about a base rotation axis, and wherein the base rotation axis of the turning joint is offset from the first arm and the second arm.

3. The robot according to claim 2,
wherein the first arm includes
- a first member, and
- a first joint configured to rotate the first member relative to the body portion about a first rotation axis, and wherein the first rotation axis is offset from the base rotation axis by a first offset distance in a first offset direction.

4. The robot according to claim 3,
wherein the second arm includes
- a first member, and
- a first joint configured to rotate the first member of the second arm relative to the body portion about a first rotation axis, and wherein the first rotation axis of the second arm is offset from the base rotation axis by a second offset distance in a second offset direction.

5. The robot according to claim 4,
wherein the first offset direction coincides with the second offset direction.

6. The robot according to claim 5,
wherein the first offset distance is equal to the second offset distance.

7. The robot according to claim 4,
wherein the first member of the first arm is opposite to the first member of the second arm relative to the body portion.

8. The robot according to claim 4,
wherein the first rotation axis of the first arm horizontally extends relative to the body in the first vertical orientation, and
wherein the first rotation axis of the second arm horizontally extends relative to the body in the first vertical orientation.

9. The robot according to claim 8,
wherein the base rotation axis of the turning joint vertically extends.

10. The robot according to claim 4,
wherein the first rotation axis of the first arm is coaxial with the first rotation axis of the second arm.

11. The robot according to claim 4,
wherein the first arm includes
- a second member,
- a second joint configured to pivot the second member relative to the first member of the first arm,
- a third member,
- the one joint provided of the first arm as a third joint configured to rotate the third member relative to the second member,
- a fourth member,
- the adjacent joint of the first arm provided as a fourth joint configured to pivot the fourth member relative to the third member,
- a fifth member,
- the another adjacent joint of the first arm provided as a fifth joint configured to rotate the fifth member relative to the fourth member,
- a sixth member, and
- a sixth joint configured to pivot the sixth member relative to the fifth member.

12. The robot according to claim 11,
wherein the second arm includes
- a second member,
- a second joint configured to pivot the second member of the second arm relative to the first member of the second arm,
- a third member,
- the one joint of the second arm provided as a third joint configured to rotate the third member of the second arm relative to the second member of the second arm,
- a fourth member,
- the adjacent joint of the second arm provided as a fourth joint configured to pivot the fourth member of the second arm relative to the third member of the second arm,
- a fifth member,
- the another adjacent joint of the second arm provided as a fifth joint configured to rotate the fifth member of the second arm relative to the fourth member of the second arm,
- a sixth member, and
- a sixth joint configured to pivot the sixth member of the second arm relative to the fifth member of the second arm.

13. The robot according to claim 12,
wherein the first distance is different from the second distance, and
wherein the third distance is different from the fourth distance.

14. The robot according to claim 12,
wherein the first distance is larger than the second distance, and
wherein the third distance is larger than the fourth distance.

15. The robot according to claim 11,
wherein the first arm further includes
- a seventh member, and
- a seventh joint configured to rotate the sixth member and the seventh member.

16. The robot according to claim 11,
wherein the first arm further includes
- a seventh member including the longitudinal end of the first arm, and
- a seventh joint configured to rotate on a rotation axis orthogonal to a rotation axis of the sixth joint and to pivot the seventh member relative to the sixth member.

17. The robot according to claim 1,
wherein the first distance is different from the second distance, and
wherein the third distance is different from the fourth distance.

18. The robot according to claim 1,
wherein the first distance is larger than the second distance, and
wherein the third distance is larger than the fourth distance.

19. The robot according to claim 1,
wherein the first arm and the second arm are attached to the body in an asymmetrical form.

20. The robot according to claim 1,
the rotational axis of the one joint of the first arm extends in the vertical direction in the first vertical orientation of the first arm,
the rotational axis of the adjacent joint of the first arm extends in the vertical direction in the first vertical orientation of the first arm, and
the rotational axis of the another adjacent joint of the first arm extends in a first direction in the first vertical orientation of the first arm, the first direction being different from the vertical direction.

21. The robot according to claim 20,
the rotational axis of the one joint of the second arm extends in the vertical direction in the second vertical orientation of the second arm,
the rotational axis of the adjacent joint of the second arm extends in the vertical direction in the second vertical orientation of the second arm, and
the rotational axis of the another adjacent joint of the second arm extends in a second direction in the second vertical orientation of the second arm, the second direction being different from the vertical direction.

\* \* \* \* \*